United States Patent

[11] 3,622,226

| [72] | Inventor | Dennis Lee Matthies<br>Princeton, N.J. |
|---|---|---|
| [21] | Appl. No. | 877,938 |
| [22] | Filed | Nov. 19, 1969 |
| [45] | Patented | Nov. 23, 1971 |
| [73] | Assignee | RCA Corporation |

[54] LIQUID CRYSTAL CELLS IN A LINEAR ARRAY
2 Claims, 3 Drawing Figs.

[52] U.S. Cl. .................................................. 350/160,
178/6.7
[51] Int. Cl. .................................................. G02f 1/28,
H04n 5/84
[50] Field of Search .......................................... 350/160,
267, 163; 178/6.7

[56] References Cited
UNITED STATES PATENTS

| 3,196,743 | 7/1965 | Dreyer | 350/160 |
| 3,322,482 | 5/1967 | Harmon | 350/267 |
| 3,459,467 | 8/1969 | Kantor | 350/163 |
| 3,499,112 | 3/1970 | Heilmeier et al. | 350/160 |

OTHER REFERENCES

" Solid State Storage Light Intensifier Panel" Darling et al.;
RCA Technical Notes No. 368 June 1960. (copy in 350– 160)

Primary Examiner—William L. Sikes
Assistant Examiner—V. P. McGraw
Attorney—Glenn H. Bruestle ABSTRACT: A linear array of individually addressed liquid crystal cells comprises a chamber formed between two light-transmitting plates. A plurality of light-transmitting electrodes are on the surfaces of the plates within the chamber, and the chamber is filled with liquid crystals. The front plate comprises a plurality of light tunnels, at least one tunnel for each cell as defined by a pair of oppositely disposed electrodes. Each tunnel has sides with light-absorbing material thereon. Light-absorbing masks on the front and backplates have slits that are in alignment with the electrodes.

PATENTED NOV 23 1971

INVENTOR
DENNIS L. MATTHIES
BY
Arthur J. Spechler
Attorney

INVENTOR
DENNIS L. MATTHIES
BY
Arthur I. Spechler
Attorney

LIQUID CRYSTAL CELLS IN A LINEAR ARRAY

BACKGROUND OF THE INVENTION

Thermotropic nematic liquid crystals are liquids with elongated polar molecules. One type of such crystals normally align themselves in an electric field so that their nearest neighbors are parallel to each other. This alignment causes a change in the light-scattering properties of these materials. In another type of such crystals, turbulence is caused when placed between two transparent electrodes and an electric current is sent through them, disturbing the ordered state and causing the scattering of light directed onto the crystals. The effective operation of liquid crystals as light valves is limited to a temperature range depending upon the liquid crystal material used; but, regardless of the type of liquid crystal material used, a change in the optical properties of the liquid crystal material is effected by the application of an electric field. In the type of liquid crystals exhibiting turbulence, an electric current is also necessary to change their optical properties.

It has been proposed to expose a light-sensitive recording element with the modulated light from a light valve, such as an array of liquid crystal cells by projecting the modulated light through a lens system onto the recording element. While such a system is satisfactory for certain applications, a lens system having a suitable flat-field and enough light-gathering power would be relatively expensive. Also, in projecting light from a relatively small array of liquid crystal cells to a relatively large recording element, some light is lost and the time of exposure of the recording element is increased, thereby reducing the speed of exposure.

The novel array of liquid crystal cells is an improvement over the aforementioned prior-art arrays in that it provides for the contact exposure of light-sensitive recording elements, thereby utilizing all of the available light, increasing the speed of exposure, and eliminating the need for an expensive lens system.

SUMMARY OF THE INVENTION

Each of the novel liquid crystal cells comprises liquid crystals disposed in a chamber formed between a pair of oppositely disposed light-transmitting electrodes on the back and front plates of light-transmitting material. The front plate has sidewalls with light-absorbing material thereon. The sidewalls are spaced a distance no greater than the width of the cell and provide a light tunnel for light transmitted through the cell.

The novel array of liquid crystal cells comprises back and front plates of light-transmitting material spaced from each other by means to provide a chamber for liquid crystals. A plurality of light-transmitting electrodes are on the plates forming the chamber, and each cell is defined by a pair of oppositely disposed electrodes. The front plate comprises a plurality of light tunnels, one for each cell. Each light tunnel has light-absorbing sidewalls to absorb scattered light. Masking means, having a slit aligned with the electrodes, may be disposed on at least one of the plates to absorb scattered light also. The front to back length of each light tunnel should be at least three times its width.

DESCRIPTION OF THE PREFERRED EMBODIMENTS

Figure 1:
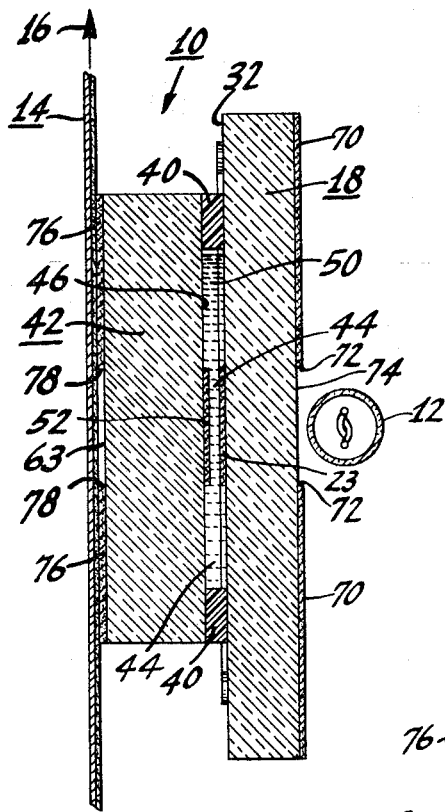
FIG. 1 is a vertical cross section of an improved array of liquid crystal cells taken along the line 1—1 in FIG. 2, showing the array disposed between a light source and a light-sensitive recording element.

Referring now to the drawings, there is shown a novel linear array 10, a light valve, of individually addressed liquid crystal cells disposed between a light source 12 and a light-sensitive recording element 14, such as an electrophotographic recording element commonly used in the electrophotographic printing art. The recording element 14 is adapted to be moved vertically across the array 10 in the direction of an arrow 16 by any suitable means, not shown. In describing the array 10, the descriptive terms of direction, such as "vertical" and "horizontal," for example, are merely relative, and it is within the contemplation of the present invention to orient the array 10 in any desired position as necessitated by the applications and equipment in which it is incorporated as a part.

Figure 3:
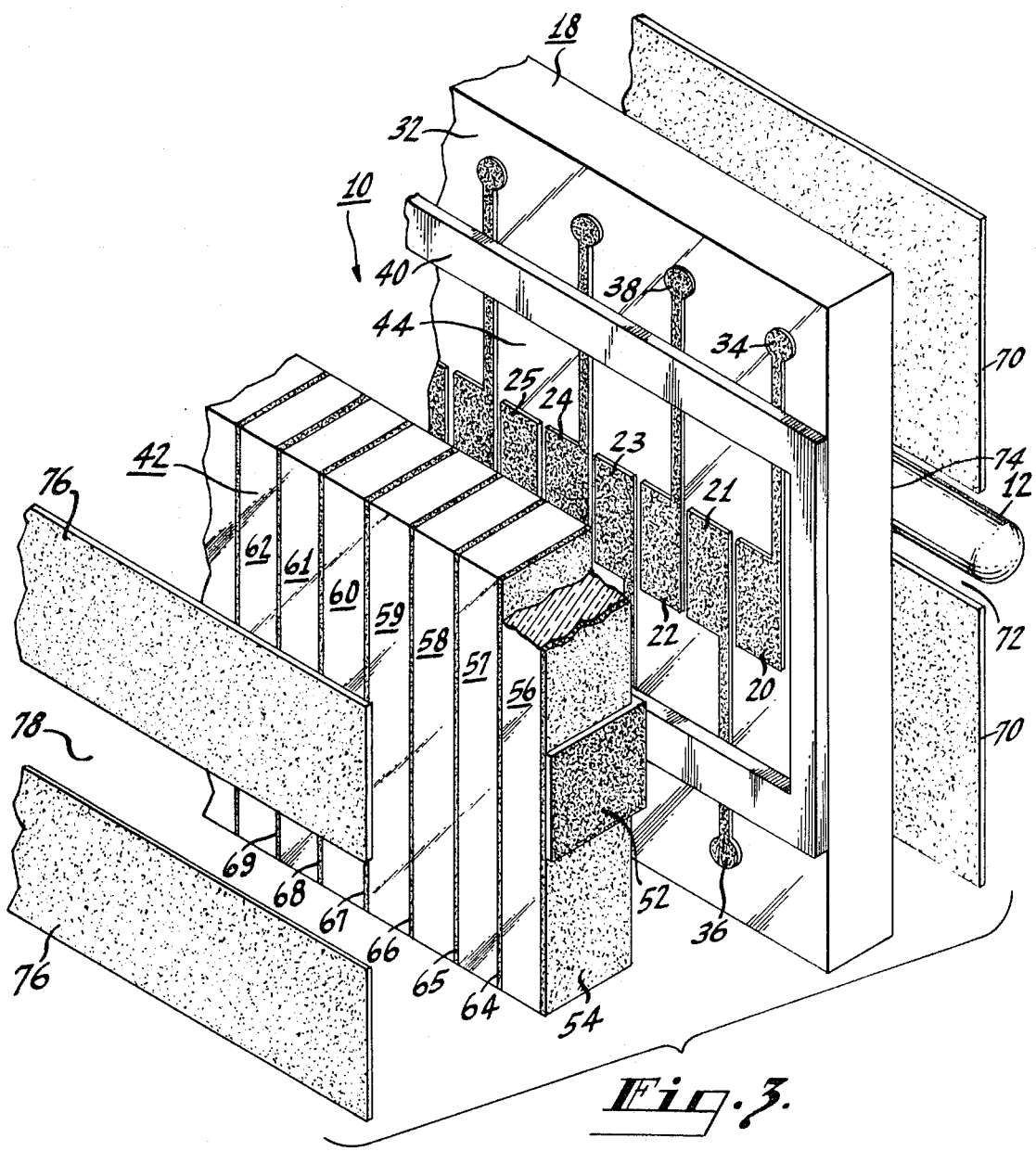
FIG. 3 is a fragmentary exploded perspective view of the novel array of liquid crystal cells shown in FIG. 2.

The array 10 comprises a backplate 18 of a light-transmitting electrically insulating material, such as glass or any suitable light-transmitting plastic material. A plurality of substantially rectangular electrodes, such as electrodes 20, 21, 22, 23, 24, and 25, for example, are disposed on the front surface 32 of the backplate 18 as shown in FIG. 3. The electrodes 20–25 are light-transparent and may comprise indium oxide or tin oxide coated on the backplate 18. Adjacent electrodes on the front surface 32 are formed with oppositely disposed connecting leads, such as leads 34, 36, and 38 for the electrodes 20, 21, and 22, respectively. By having the leads of adjacent electrodes extend in opposite directions, electrical connections to the leads are facilitated and the possibility of shorting adjacent leads is greatly reduced.

Each of the rectangular electrodes 20–25 is about 10 mils wide and 10 mils in height, and spaced from its adjacent electrode by about 1 mil. Most of the dimensions of the array 10, except where specifically indicated, are not critical. Also, the drawings are not to scale, certain parts being exaggerated to illustrate their structures.

The backplate 18 is about 60 mils in thickness, about 2 inches in height, and may be as wide as desired, depending upon the application to which the array 10 is to be put. While only a few electrodes 20–25 are illustrated in the fragmentary view of FIG. 3, the array 10 may comprise as many electrodes as necessary to provide the number of cells desired.

Figure 2:
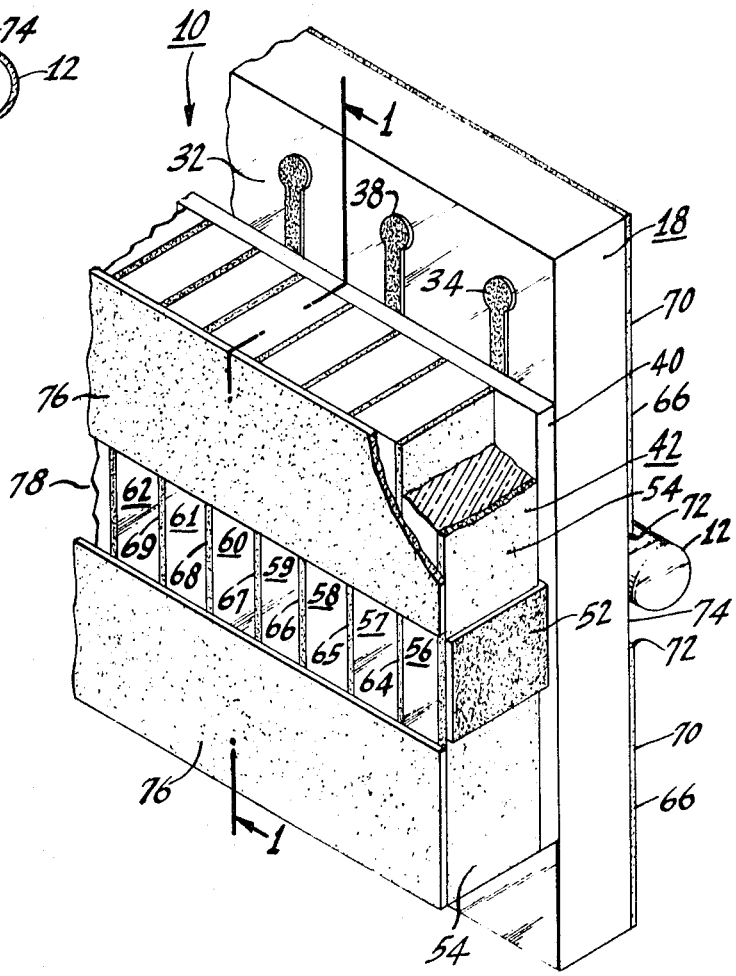
FIG. 2 is a fragmentary perspective view of the novel array of liquid crystal cells, viewed from the front, top, and right side.

A rectangular spacer 40, in the form of a square washer of an inert plastic material, such as "Teflon," for example, is disposed on the front surface 32 of the backplate 18 so that the horizontal portions of the spacer 40 lie across the leads of the electrodes 20–25 and its vertical portions are parallel to the vertical edges of the backplate 18, as shown in FIGS. 2 and 3. The spacer 40 may have a thickness in the range between one-fourth and one-half mil. A front plate 42 whose height and width are of the same dimensions as the overall height and width of the spacer 40 is placed against the spacer 40 for forming, with plate 18, a reservoir or a chamber 44 for liquid crystals, as shown in FIG. 1 and 3.

The chamber 44, defined within the spacer 40 by the front surface 32 of the backplate 18 and the rear surface 46 of the front plate 42, is filled with a liquid crystal material 50. The liquid crystal material 50 may be a single, organic, thermotropic, nematic compound, such as p-anisal p'-amino-phenylacetate

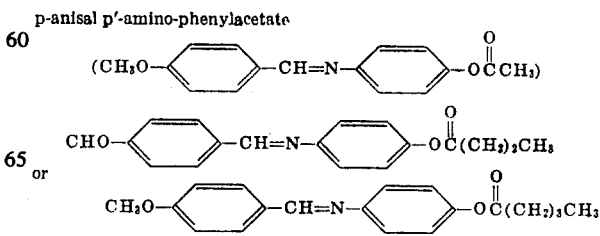

for example, or a mixture, such as a mixture of equal parts, by weight, of the three aforementioned compounds. When the liquid crystal material 50 consists of a mixture of equal parts, by weight, of the aforementioned three compounds, it has the advantages of a low crystal mesophase transition temperature (25° C.) and a wide operating temperature range (25°–105°

C.) in which the mesophase is stable. Other liquid crystal materials suitable for use in the novel array 10 are described in U.S. Pat. No. 3,322,485, issued to R. Williams on May 30, 1967, for ELECTRO-OPTICAL ELEMENTS UTILIZING AN ORGANIC NEMATIC COMPOUND.

When the chamber 44 is filled with the liquid crystal material 50, the chamber may be sealed permanently by placing thin polyethylene gaskets (not shown) between the spacer 40 and the plates 18 and 42 and heating the sandwich consisting of the plates, the gaskets, and the spacer to a temperature of about 110° C. until the spacer 40 adheres to the plates 18 and 42, the fused gaskets acting as an adhesive. Any other suitable adhesive may also be used.

A common electrode 52 is disposed on the rear surface 46 of the front plate 42. The common electrode 52 is disposed directly opposite to the linearly aligned electrodes 20–25 on the front surface 32 of the backplate 18 and cooperates with each of the plurality of electrodes 20–25 to form a plurality of liquid crystal cells. The common electrode 52 is brought out to a sidewall 54 of the front plate 42 to provide electrical contacting means for an electrical connection thereto. It is also within the contemplation of the invention for the array 10 to employ a plurality of separate electrodes instead of the electrode means in the form of the common electrode 52. Each liquid crystal cell of the array 10, however, is defined by a pair of oppositely disposed electrodes, that is, each of the electrodes 20–25 forms a separate liquid crystal cell with the common electrode 52. The width of each liquid crystal cell is the width of the smaller of the two electrodes in the pair that defines the cell.

The front plate 42 is a laminae of a plurality of light-transmitting bodies, such as similarly aligned light tunnels 56, 57, 58, 59, 60, 61, and 62 fixed to, or integral with, each other and disposed to transmit light from the rear surface 46 to the front surface 63 of the front plate 42. Each of the light tunnels 56–62 comprises a parallelepiped structure whose width is no greater than the width of the electrode defining a liquid crystal cell and whose front to back length, that is, the distance between the front surface 63 and the rear surface 46, is at least three times its width. The width of a light tunnel may be smaller than the width of an electrode defining a liquid crystal cell. The light tunnel 56, as shown in FIGS. 2 and 3, is sealed to the spacer 40 and, therefore, is not used to direct light from a cell.

Opposite sidewalls of each of the light tunnels 56–62, that is, the adjacent sidewalls of the adjacent light tunnels 56–62, are coated or covered with, or separated by, layers 64–69 of suitable light-absorbing material, such as black paint, dark adhesive material, or vanes of black material. The light tunnels 56–62 may be a plurality of parallelepiped transparent glass structures laminated together with a black adhesive, such as black epoxy glue. The front plate 42 may also be of a light-transmitting laminated structure of a plastic material, such as "Light Control Film" supplied by the 3-M Company (Minnesota Mining and Manufacturing Co.). The "Light Control Film" consists of a plurality of parallelepiped structures separated by black light-absorbing plastic vanes in a structure of the dimensions described for the light tunnels 56–62 comprising the front plate 42.

The array 10 is provided with masking means to absorb light from the light source 12 that does not pass directly through the liquid crystal cells. To this end, a rear mask 70 formed with a horizontal slit 72 is applied to the rear surface 74 of the backplate 18, and a front mask 76 formed with a horizontal slit 78 is applied to the front surface 63 of the front plate 42. The masks 70 and 76 comprise a light-absorbing material, such as black paint, for example, and the slits 72 and 78 are aligned with the electrodes 20–25. The height of each of the slits 72 and 78 of the masks 70 and 76, respectively, and the height of each of the electrodes 20–25 and the common electrode 52 are substantially equal and the slits and the electrodes are in alignment.

In operation, the liquid crystal cells are illuminated by light from the light source 12, the light being directed by the mask 70 to pass through the light tunnels 56–62. When a cell is in its transparent state, the light from the light source 12 goes directly through the cell and strikes the light-sensitive recording element 14 in substantial contact with the front mask 76. When the liquid crystal cell is in its light scattering state, light from the light source 12 is scattered so that it hits the black light-absorbing layers 64–69 of the tunnels in the front plate 42 and/or the light-absorbing mask 76. Hence, the light output is diminished to a point where the recording element 14 is not exposed.

Thus, any light from the light source 12 that strikes either the light-absorbing masks 70 or 76 or the light-absorbing layers 64–69 of the light tunnels 56–62 is absorbed, and only light passing directly through the light tunnels reaches the recording element 14 to expose it. By absorbing all but the direct rays of light from the light source 12, the novel array 10 provides means to expose the recording element 14 with rays of light (from each cell) of better contrast and resolution than possible with prior-art arrays.

I claim:

1. A linear array of liquid crystal cells comprising:

a backplate and a front plate, each being of a light-transmitting material and having front and rear surfaces, spacer means spacing the front surface of said rear plate from the rear surface of said front plate and providing a chamber for liquid crystals a plurality of light-transmitting electrodes on one of said surfaces in said chamber, light-transmitting electrode means on the other of said surfaces in said chamber adapted to provide discrete electric fields between said electrode means and each of said plurality of electrodes when signals are applied between said electrode means and said plurality of electrodes, respectively; the width of each of said plurality of electrodes defining the width of each of said cells, respectively, said front plate comprising a plurality of solid, continuous, light tunnels, one for each of said cells, and each tunnel having sidewalls of light-absorbing material, and the front to rear distance of each of said tunnels being at least three times the distance between said sidewalls, the width of each of said tunnels being relatively much greater than the width of said light-absorbing material, and all of said cells being aligned in one line only, whereby a light-sensitive recording element may be moved across said front plate for continuous selective exposure to light directed through said cells.

2. A linear array of liquid crystal cells as defined in claim 1 wherein:

said plurality of electrodes is in a single straight line alignment, and masking means, formed with a slit, are on one of said plates; and said slit, said plurality of electrodes and said tunnels are substantially in linear alignment.

* * * * *